June 6, 1939.　　　G. F. WIKLE　　　2,161,117
TIRE STITCHING APPARATUS
Filed Aug. 5, 1937　　　2 Sheets-Sheet 1

INVENTOR.
GEORGE F. WIKLE
BY Gourley & Budlong
ATTORNEYS.

June 6, 1939.  G. F. WIKLE  2,161,117
TIRE STITCHING APPARATUS
Filed Aug. 5, 1937  2 Sheets-Sheet 2

INVENTOR.
GEORGE F. WIKLE
BY Gourley & Dudley
ATTORNEYS.

Patented June 6, 1939

2,161,117

UNITED STATES PATENT OFFICE 2,161,117

TIRE STITCHING APPARATUS

George F. Wikle, Detroit, Mich., assignor, by mesne assignments, to United States Rubber Company, New York, N. Y., a corporation of New Jersey Application August 5, 1937, Serial No. 157,583

5 Claims. (Cl. 154—10)

This invention relates to pneumatic tire building, and in particular to stitching means for joining together the various constituents of a tire carcass on a building drum. In general, the invention comprises means for stitching tire fabrics in assembly with a tire building drum, said stitching means including an arrangement of a stitching disc whereby controlled pressures under variably directed forces may be exerted against various surfaces of the tire building drum.

In the manufacture of pneumatic tires it is becoming general practice to build large size tires according to the drum method, as distinguished from the core method of building tires. In conventional practice of building heavy service tires, for example those having eight or more fabric plies, the plies are assembled upon the drum or core in individual layers supplied from a roll or other source of fabric. In the manufacture of tires using the present apparatus, the fabric plies may be first assembled in the form of pulley bands constituting, for example, a pair of plies of fabric spliced together. These pulley bands are axially stretched over the drum, so that they fit snugly across the face of the drum, but at the marginal portions the fabric plies must be stitched to conform to the shape of the shouldered drum surface. Tire building drums for large size tires differ somewhat from the conventional type of building drum in that they have undercut portions in the region of the tire beads. In order to apply the tire fabrics to tire building drums having this undercut shoulder feature, the stitching means for turning the various plies around the drum in the region of the tire beads is the principal and most important apparatus for effecting proper assembly of the plies. It is, therefore, among the objects of my invention to provide an efficiently operating stitcher capable of directing a uniform and equalized pressure against the various constituents of the tire carcass on different surfaces of the drum.

For a more detailed description of my invention, reference may be had to the following description and accompanying drawings in which.

Figure 1:
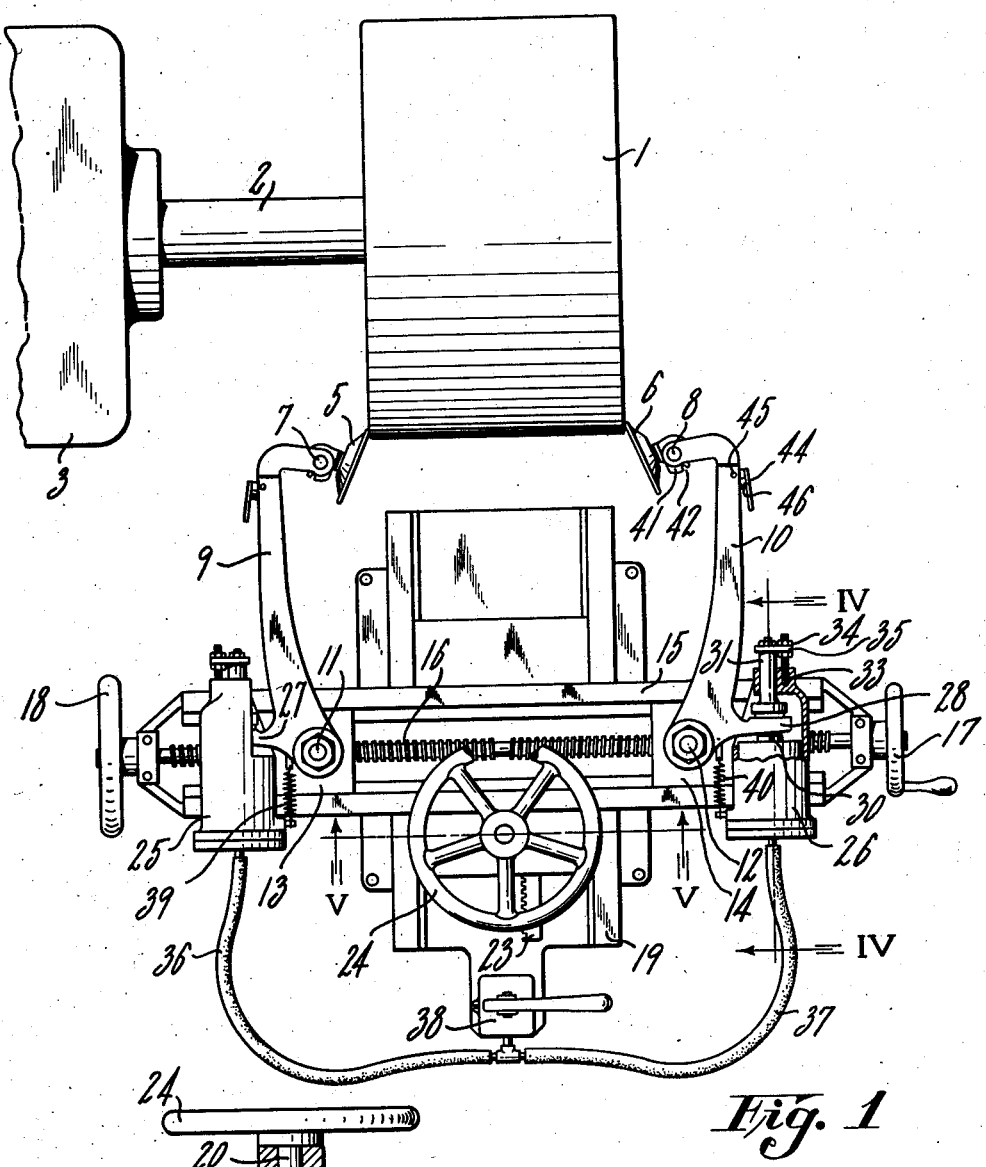
Fig. 1 is a plan view of a stitching apparatus incorporating the embodiments of my invention.
Figure 5:
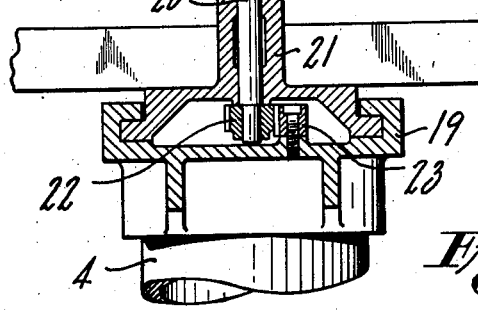
Fig. 5 is a transverse view, in section, of a stitcher carriage, taken along section line V—V of Fig. 1.
Figure 2:
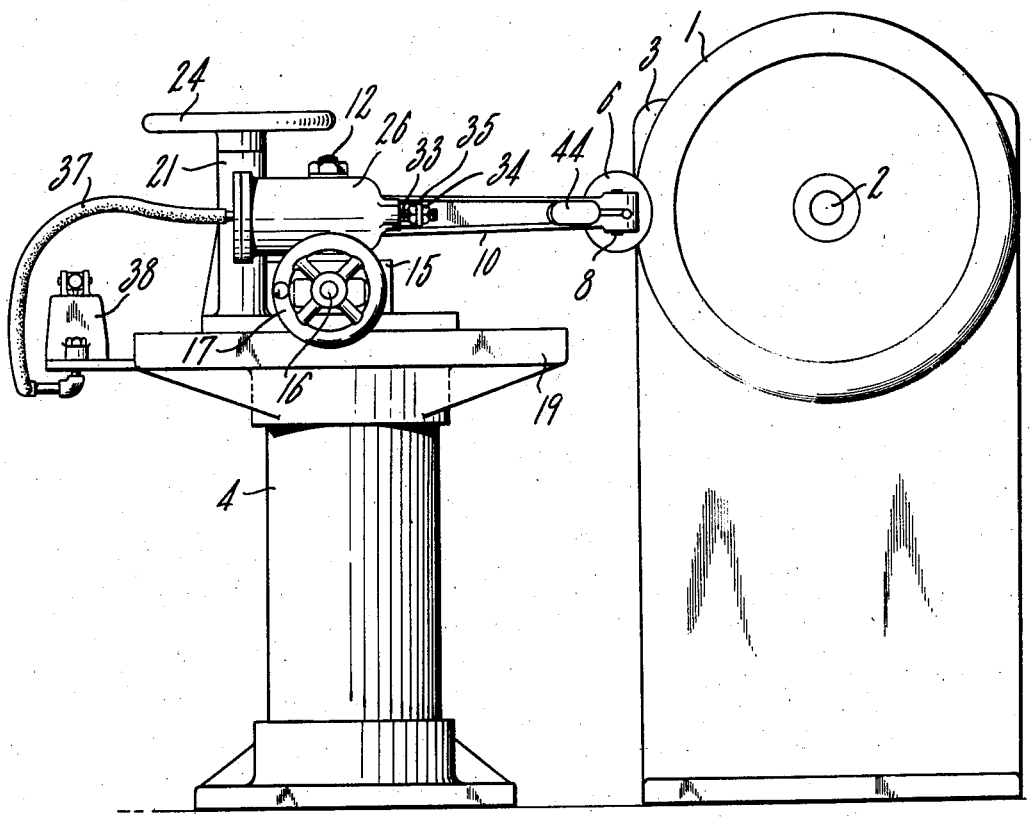
Fig. 2 is a side elevational view thereof.

With reference to the drawings, and in particular to Figs. 1 and 2, I show stitching apparatus of my invention in operable position in relation to a tire building drum 1 mounted on a shaft 2 supported by a tire building frame 3. The stitching apparatus is supported by a pedestal 4 which indirectly supports stitching wheels 5 and 6 in tangential relation with the tire building drum 1. The stitching wheels 5 and 6 are pivotally supported at 7 and 8 by the arms 9 and 10, respectively. The arms 9 and 10 are, in turn, pivotally mounted at 11 and 12 on a pair of slidable carriages 13 and 14, respectively. The carriages 13 and 14 are slidable in a direction parallel to the axis of the drum 1 and are supported by a second carriage 15 movable radially of the drum 1. The carriages 13 and 14 are associated with a threaded shaft 16 having right and left hand threads, so that the carriages 13 and 14 move simultaneously either toward or away from each other.

A hand wheel 17 provides manual means for rotating the threaded shaft 16 and for moving the carriages 13 and 14. At the end of the threaded shaft 16 opposite the hand wheel 17 is a wheel 18 which operates in effect as a fly wheel for increasing the efficiency of the manual operation of the means for reciprocating the carriages 13 and 14.

The second carriage 15 is movable radially toward or away from the building drum 1, and is slidably associated with a track member 19 positioned on top of the pedestal member 4. A shaft 20 mounted in a hub 21 extending from the carriage 15 has attached thereto a gear 22 which meshes with a rack 23 secured to the track member 19. Manual operating means in the form of a hand wheel 24 is secured to the opposite end of the shaft 20, the rotation of which results in movement of the carriage 15 either toward or away from the drum 1.

A pair of fluid operable cylinders 25 and 26 are attached to the carriages 13 and 14, respectively, for exerting pressure against the arms 9 and 10 through secondary arms or projections 27 and 28 extending from the arms 9 and 10, respectively. As shown more particularly in Fig. 4, the cylinder 26, which is similar to cylinder 25, contains a piston 29 having a projection 30 in its leading axial portion for engagement with the projection 28 of the arm 10. Movement of the projection 28 is limited by a stop shaft 31 having a resilient pad 32 secured thereto against which the projection 28 contacts. The stop shaft 31 (Fig. 1) is adjustable by means of the threaded rod 33 and lock nuts 34 which engage an arm 35 secured to the end of the stop shaft 31. Fluid is admitted to the cylinders 25 and 26 through flexible hose connections 36 and 37, respectively. A conventional valve 38 joins the hose connections 36 and 37. Springs 39 and 40 attached to the arms 9 and 10 normally maintain the projections 27 and 28 against the projections 30 of the pistons.

As shown in detail in Fig. 3, each of the stitcher wheels, as described in connection with the wheel 6, is freely rotatable on its axis and is supported by a hub 41. The hub 41 is pivoted at 8 at right angles to the axis of the stitcher wheel 6. A plurality of notches 42 in the hub 41 are adaptable for complementary engagement with a latch member 43, the result of which is to secure the hub member 41 in fixed relation with the arm 10. A lever 44 pivotally attached at 45 to the arm 10 joins with the latch member 43 for providing manual means for releasing the latch member from engagement with the hub 41. A spring 46 normally retains the lever 44 in a position so as to maintain the hub 41 in locked relation with the arm 10. Due to the plurality of notches 42 in the hub member 41, the stitcher wheel 6 may be moved into the various positions shown by the dot-and-dash line outlines 47 and 48. The dot-and-dash line 49 spaced from the drum 1 indicates the outer surface of the constituents forming the tire carcass.

In assembling fabric plies on the drum 1, the stitching wheels 5 and 6 and their associated mechanisms are moved to their normal position out of contact engagement with the drum 1. The plies, in spliced pairs of fabric layers in the form of pulley bands, are successively stretched and mounted on the drum 1 so that they conform tightly to the face of the drum. The underlying plies are thus automatically made to conform with the face of the drum by the pressure of being stretched thereon, while their edges in the region of the bead portion of the tire are stitched down by the action of the stitcher wheels. When two or more plies are assembled on the drum 1, the operator manipulates the hand wheels 17 and 24 for bringing the stitcher wheels 5 and 6 into contact engagement with the assembled plies near their edges. The valve 38 is operated to permit fluid under pressure to enter the cylinders 25 and 26. This valve is permitted to remain open throughout the entire building operation. In performing this operation the operator controls movement of the stitcher wheels by manipulating the hand wheels 17 and 24 simultaneously.

The projection 28 extending from the arm 10, due to the operation of the cylinder 26, is normally positioned so that the projection 28 is in contact engagement with the resilient pad 32. However, when the hand wheels are so manipulated that the stitcher wheels are forced against the tire constituents near the shoulder of the drum, the projection 28 moves away from the pad 32, resulting in a cushioning effect and uniform pressure of the stitching wheels against the tire constituents. This is of importance when the various irregularities of the assembled tire elements are considered; as, for example, splices in the fabric plies and irregularities occurring around the shoulder of the drum from the tire bead. The structure and function of the cylinder 25 is similar to the cylinder 26, and the projection 27 extending from the arm 9 cooperates with the cylinder 25 in the same manner as the projection 28 cooperates with the cylinder 26. Another advantage of the cylinders 25 and 26 is that equalized pressure between the different stitching wheels is obtained.

Figures 3, 4:
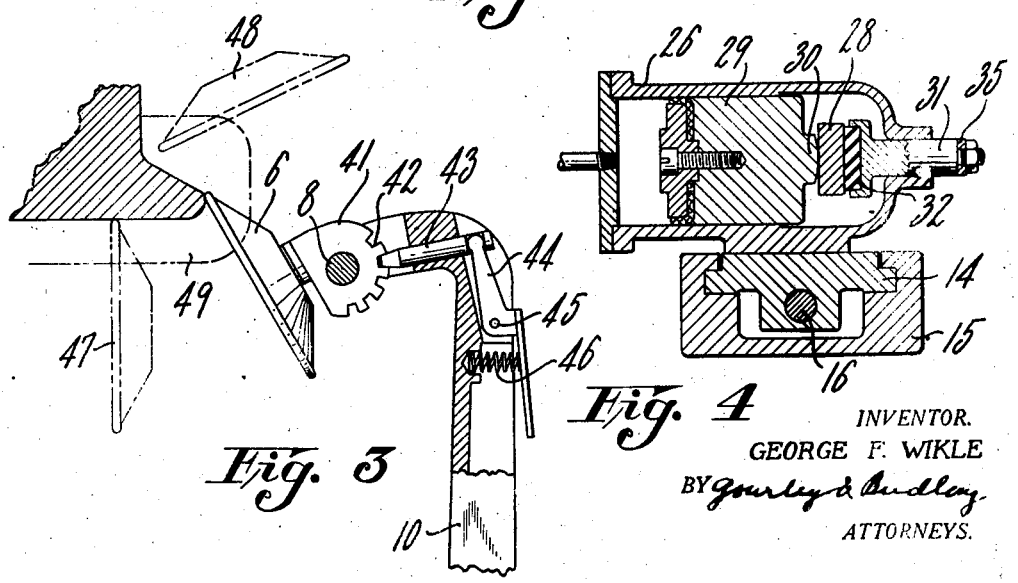
Fig. 3 is a plan view, partly in section, of the stitching wheel in engagement with the marginal edge of a tire drum, and showing in dot-and-dash lines other positions assumed by the stitching wheel.
Fig. 4 is a longitudinal view, in section, of a pneumatic cylinder, taken along section line IV—IV of Fig. 1.

When it is desired to stitch the fabrics at the marginal area of the drum, the axis of the stitching wheels may be varied, as shown in Fig. 3. These variations permit the discs or wheels 5 and 6 to engage the fabric on the drum face, on shoulders and behind the shoulders substantially tangentially with a uniform pressure. This operation is performed manually, and is easily and quickly accomplished by the operator with one hand. After the first pulley band of fabric plies has been stitched down around the shoulder portions of the drum 1, successive pulley bands are applied and laid down in a similar manner.

When the final ply is reached, the stitching wheels 5 and 6 are brought together at the central plane of the drum 1 and are moved outwardly toward the marginal portions thereof. During this operation, the hand wheel 24 remains in a fixed position, while the necessary adjustment may be effected merely by controlling the hand wheel 17 to move the stitcher wheels 5 and 6 axially with respect to the surface to be stitched. The force produced by the stitcher engaging the drum is such that the projection 28 extending from the arm 10 bears directly against the stop 31. Consequently the pneumatic cylinders do not function at this time. The underlying plies provide adequate cushioning means for preventing injury to the fabric being stitched along the face of the drum.

An entirely different condition arises in stitching the plies around the bead portion of the drum. It is necessary to stitch each pair of the assembled plies individiually at the bead region. In stitching the first pair of plies around the shoulder of the drum, it is necessary not only to equalize the pressure of both stitchers against each shoulder of the drum, but also to limit the amount of pressure which may be exerted against the stitchers in this operation. The pneumatic cylinders 25 and 26 operate in this region in order to prevent the operator from exerting sufficient pressure on the stitcher wheels against the two plies asembled on the drum to cut or detrimentally crush the cords of the fabric. This twofold function of the pneumatic cylinder comes into play only at the shoulder region of the drum, where it is needed, especially because of the presence of the hard surfaces of the bead wire in that region.

While I have shown a present preferred embodiment of the invention, it is understood that it is susceptible of such modifications as may appear obvious, except as limited by the scope of the appended claims.

Having thus described my invention, what I claim and desire to protect by Letters Patent is:

1. In a tire building machine, the combination with a tire building drum of a stitching means comprising a pair of stitcher wheels, means for moving the stitcher wheels radially of the drum, stitcher wheel supporting arms mounted for pivotal movement in the plane of the drum axis, a support for each pivot, means for moving the pivot supports lengthwise of the drum, and cushioning means cooperating with the arms for regulating their movements about the pivots.

2. In a tire building machine, the combination with a tire building drum of a stitching means comprising a pair of stitcher wheels, means for moving the stitcher wheels radially of the drum, stitcher wheel supporting arms mounted for pivotal movement in the plane of the drum axis, a support for each pivot, means for moving the pivot supports lengthwise of the drum, and fluid operable cushioning means cooperating with the arms for regulating their movements about the pivots.

3. In a tire building machine, the combination with a tire building drum of stitching means comprising a pair of arms adaptable for pivotal movement in the axial plane of the drum, a stitcher wheel mounted at the end of each arm in tangential relation with the drum, a pair of carriages adaptable for reciprocal movement lengthwise of the drum for supporting each of said arms, a second carriage movable radially of the drum for supporting the first named carriages, a secondary arm projecting from each of the first named arms, and a cylinder and a fluid operable piston working in the cylinder for engagement with each of the secondary arms whereby a cushioning medium is provided between the stitcher wheels and the means for moving the wheels against the drum.

4. In a tire building machine, the combination with a tire building drum of stitching means comprising a pair of arms adaptable for pivotal movement in the axial plane of the drum, a stitcher wheel mounted at the end of each arm in tangential relation with the drum, independent means for changing the axis of the stitcher wheels relative to the axis of the drum, a pair of carriages adaptable for reciprocal movement lengthwise of the drum for supporting each of said arms, a second carriage movable radially of the drum for supporting the first named carriages, a secondary arm projecting from each of the first named arms, and a cylinder and a fluid operable piston working in the cylinder for engagement with each of the secondary arms whereby a cushioning medium is provided between the stitcher wheels and the means for moving the wheels against the drum.

5. In a tire building machine, the combination with a tire building drum of stitching means comprising a pair of arms adaptable for pivotal movement in the axial plane of the drum, a stitcher wheel mounted at the end of each arm in tangential relation with the drum, a hub pivotally attached to each of the arms for supporting the stitcher wheels, the axis of the pivot extending substantially at right angles to the axis of the drum, said hubs having notches therein for securing same in variable positions relative to the arms, a pair of carriages adaptable for reciprocal movement lengthwise of the drum for supporting each of said arms, a second carriage movable radially of the drum for supporting the first named carriages, a secondary arm projecting from each of the first named arms, and a cylinder and a fluid operable piston working in the cylinder for engagement with each of the secondary arms whereby a cushioning medium is provided between the stitcher wheels and the means for moving the wheels against the drum.

GEORGE F. WIKLE.